(12) United States Patent
Gill, II

(10) Patent No.: US 9,924,711 B1
(45) Date of Patent: Mar. 27, 2018

(54) SELF CONTAINED ADJUSTABLE DECOY

(71) Applicant: Donald D. Gill, II, Knoxville, AR (US)

(72) Inventor: Donald D. Gill, II, Knoxville, AR (US)

( * ) Notice: Subject to any disclaimer, the term of this patent is extended or adjusted under 35 U.S.C. 154(b) by 0 days.

(21) Appl. No.: 15/415,179

(22) Filed: Jan. 25, 2017

Related U.S. Application Data

(63) Continuation-in-part of application No. 14/465,151, filed on Aug. 21, 2014.

(51) Int. Cl.
  *A01M 31/06* (2006.01)
  *G05D 7/06* (2006.01)
  *H02J 7/00* (2006.01)

(52) U.S. Cl.
  CPC ............ *A01M 31/06* (2013.01); *G05D 7/0676* (2013.01); *H02J 7/0052* (2013.01)

(58) Field of Classification Search
  None
  See application file for complete search history.

(56) References Cited

U.S. PATENT DOCUMENTS

| | | | |
|---|---|---|---|
| 3,247,402 A | 4/1966 | Hayden | 307/132 |
| 4,612,722 A * | 9/1986 | Ferrell | A01M 31/06 43/26.1 |
| 5,377,439 A | 1/1995 | Roos et al. | 43/3 |
| 6,601,333 B2 * | 8/2003 | Cicoff | A01M 31/06 43/2 |
| 6,655,070 B2 | 12/2003 | Wood | 43/2 |
| 7,472,508 B2 | 1/2009 | Myers, IV | 43/3 |
| 7,841,123 B2 | 11/2010 | Walker | 43/3 |
| 8,256,155 B1 | 9/2012 | Goodwill et al. | 43/3 |
| 2004/0025770 A1 * | 2/2004 | Saunoris | A01M 31/00 114/144 A |
| 2008/0155878 A1 * | 7/2008 | Myers | A01M 31/06 43/3 |
| 2012/0090217 A1 * | 4/2012 | Young | A01M 31/06 43/3 |

* cited by examiner

*Primary Examiner* — Kristina N Junge
(74) *Attorney, Agent, or Firm* — Keisling + Pieper PLC; David B. Pieper

(57) ABSTRACT

A remote control duck decoy using an electrical circuit with a time charge relay decoy using a hollow body to contain a remote activated electrical circuit operating a motor pump system to move water to create ripples and movement of the duck body. Adjustable timing, adjustable water flow, through body connections and adjustments, remote control, and a removable tail charging port are just some of the advantages taught by the present invention. These and other objects and advantages of the present invention, along with features of novelty appurtenant thereto, will appear or become apparent by reviewing the following detailed description of the invention.

11 Claims, 4 Drawing Sheets

US 9,924,711 B1

SELF CONTAINED ADJUSTABLE DECOY

CROSS-REFERENCE TO RELATED APPLICATIONS

This application claims priority to and is a continuation-in-part of U.S. Utility application Ser. No. 14/465,151, filed Aug. 21, 2014 by Donnie Gill entitled SELF CONTAINED ADJUSTABLE DECOY. This prior application is incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to improvements in decoys. More particularly, the invention relates to improvements particularly suited for providing water fowl decoys that can be selectively activated and adjusted for environmental conditions. In particular, the present invention relates specifically to a duck decoy including a water ripple mechanism in a self contained unit that is selectively adjustable to achieve realistic action for the particular environment.

2. Description of the Known Art

As will be appreciated by those skilled in the art, duck decoys are known in various forms. Patents disclosing information relevant to decoys include: U.S. Pat. No. 8,256,155, issued to Goodwill, et al. on Sep. 4, 2012, entitled Simulated fowl swimming apparatus; U.S. Pat. No. 7,841,123, issued to Walker on Nov. 30, 2010, entitled Waterfowl feeding decoy; U.S. Pat. No. 7,472,508, issued to Myers, IV on Jan. 6, 2009; entitled Swimming waterfowl decoy with spray; U.S. Pat. No. 6,655,070, issued to Wood on Dec. 2, 2003, entitled Steam jet propelled waterfowl decoy; and U.S. Pat. No. 5,377,439, issued to Roos, et al. on Jan. 3, 1995 entitled Remote controlled decoy. A patent related to flasher switches is U.S. Pat. No. 3,247,402, issued to Hayden on Apr. 19, 1966 entitled Flasher switch. Each of these patents is hereby expressly incorporated by reference in their entirety.

From these prior references it may be seen that these prior art patents are very limited in their teaching and utilization, and an improved decoy is needed to overcome these limitations.

SUMMARY OF THE INVENTION

The present invention is directed to an improved decoy using a hollow body to contain a remote activated electrical circuit operating a motor pump system to move water to create ripples and movement of the duck body. Adjustable timing, adjustable waterflow, through body connections and adjustments, remote control, and a removable tail charging port are just some of the advantages taught by the present invention. These and other objects and advantages of the present invention, along with features of novelty appurtenant thereto, will appear or become apparent by reviewing the following detailed description of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
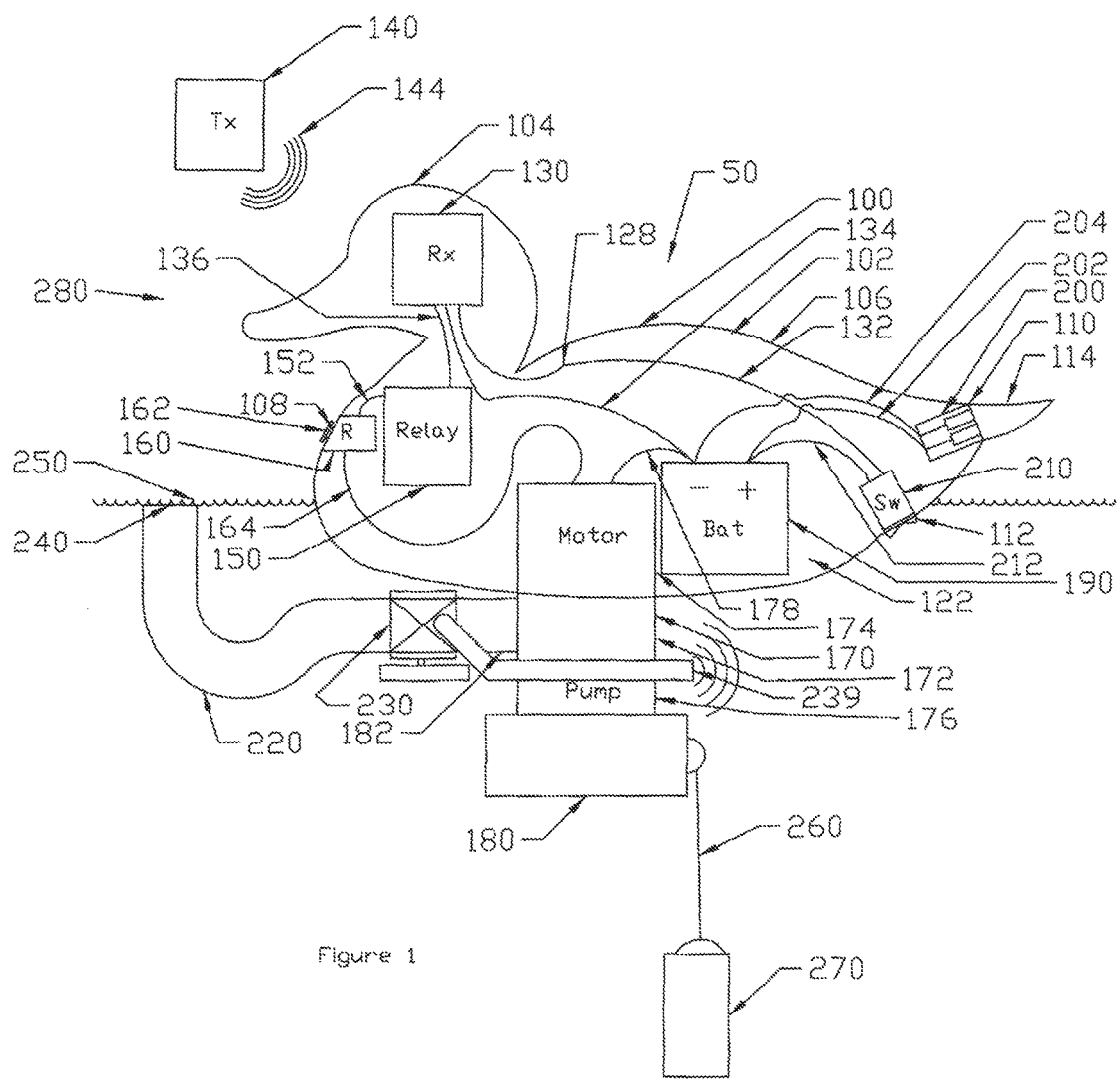
FIG. 1 is a schematic view of a decoy with a housing containing a control system.
Figure 2:
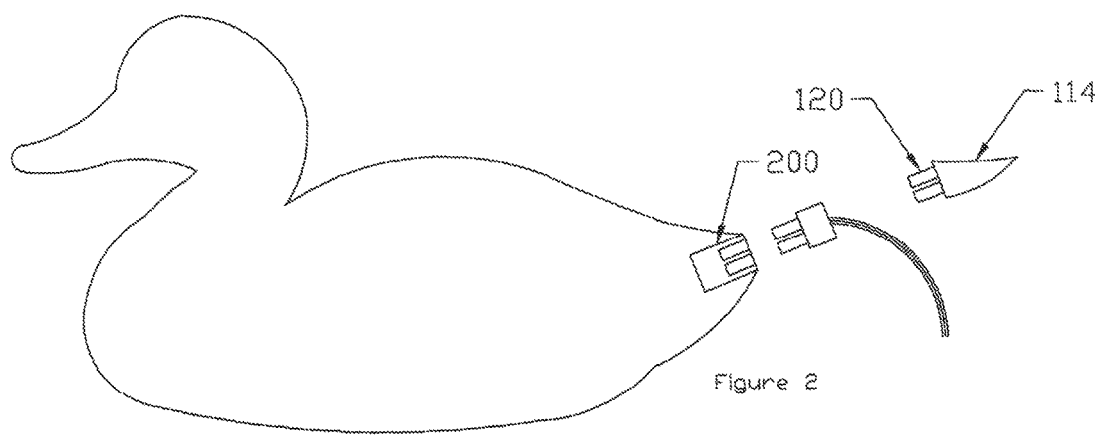
FIG. 2 shows the housing of FIG. 1 with the removable tail section and charging plug.
Figure 3:
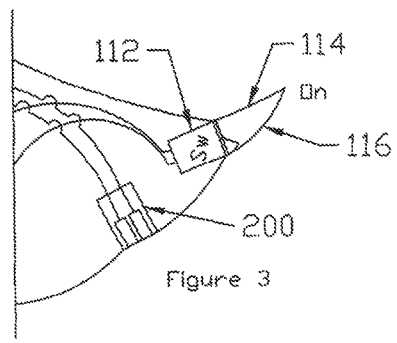
FIG. 3 shows the tail implemented with an on off switch and the switch in the on position.
Figure 4:
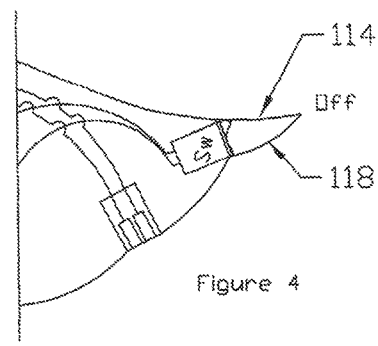
FIG. 4 shows the tail switch in the off position.

As shown in FIGS. 1 through 7 of the drawings, one exemplary embodiment of the present invention is generally shown as a decoy 50. In the preferred embodiment, the decoy 50 is made with a housing 100 that resembles the shape of a duck, but any water creature shape would be appropriate. The housing 100 includes an outer wall 102 that defines a shape including a head section 104, body section 106, tail section 114 and an inner compartment 122. The body section includes a front access aperture 108, a tail access aperture 110, and a bottom access aperture 112. As shown in FIGS. 2 and 3, the tail section 144 can be either removable or may be moveably attached to the body section 106. In FIG. 2, the tail section 114 is designed to be removable and includes tail connection extensions 120 that fit into the charging port 200 to hold the tail section in place. Alternative as shown in FIG. 3, the tail section 114 can be attached to a switch 210 and can be moved between a tail on position 116 and a tail off position 118.

The inner compartment 122 is sized to house the majority of the electrical components that make up the control system 125 during use with the exception of the transmitter 140, although it is envisioned that a transmitter storage compartment could be built in for storing the transmitter during non-use periods of the decoy 50. As shown in FIG. 1, the inner compartment 122 contains the receiver 130 that is electrically connected using a switch wire 132 that connects to the on/off switch 210, a power ground wire 134 that connects to the battery 190 at the negative terminal, and a power out wire 136 that connects to the time pulsing relay 150. The transmitter 140 is used to wirelessly communicate with the receiver 130 and is activated via a user activated button 142 to send on and/or off wireless signals 144 to the receiver 130. We used an automotive door opening transmitter/receiver set selected to be able to operate on the 12v battery with the activation signal requirement of the time pulsing relay 150.

The time pulsing relay 150 is connected by a relay power out wire 152 to the adjustable pulse resistor 160. The time pulsing relay 160 selected for the preferred embodiment is from TRIDON USA, 15-27 Derby Street, Silverwater NSW 2128, Australia and is a two terminal flasher relay described in U.S. Pat. No. 3,247,402 as previously discussed. Because this type of flasher relay relies on discharge rates for decay time, the adjustable pulse resistor 160 allows for controlling the discharge time by increasing or decreasing resistance in the discharge circuit. The adjustable pulse resistor 160 is sealably mounted through the front access aperture 108 with an exposed external pulse control knob 162 that can be manipulated by the user to adjust the pulse rate of the time pulsing relay 160. In this manner, the frequency of the pulsing movement can be controlled to simulate a highly active duck, or a slow moving relaxed duck. The resistor power out wire 164 is connected to the motor pump assembly 170.

The motor pump assembly 170 is a TSUNAMI Bildge Pump Model T500, available from ATTWOOD Corporation, 1016 N. Monroe Street, Lowell, Mich. 49331. For this application it is noted that this motor pump assembly 170 includes an assembly housing 172 with a top motor 174 operating a bottom pump 176 with a water pickup 180 and an output pipe 182. The motor pump assembly 170 is connected via the motor ground wire 178 to the negative terminal of the battery 190. An anchor tether 260 is connected to the assembly housing 172 and extends down to an anchor weight 270 to maintain the relative position of the decoy 50 during use. The anchor tether is preferably a self winding spring type of tether such as that used in key chains, retractable dog leashes, or fishing net cable tethers with a cable winding mechanism for storage.

The battery 190 is also connected to the charging port 200 via the positive terminal connection wire 202 and the negative terminal connection wire 204, and the switch 210 via the positive switch connection 212. The battery is a 12 Volt, 4.4 aH Li-ion battery selected to match the motor pump assembly 170 power requirements for a full day of hunting with the decoy 50.

Figure 6:
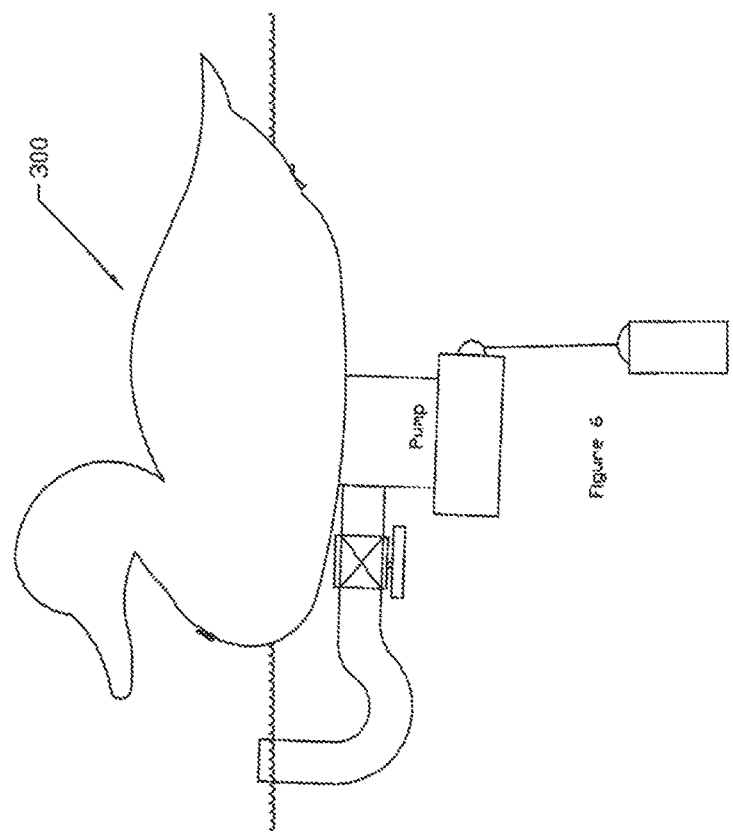
FIG. 6 shows the counter movement back position after the flow shut off and before returning to a stable position.
Figure 5:
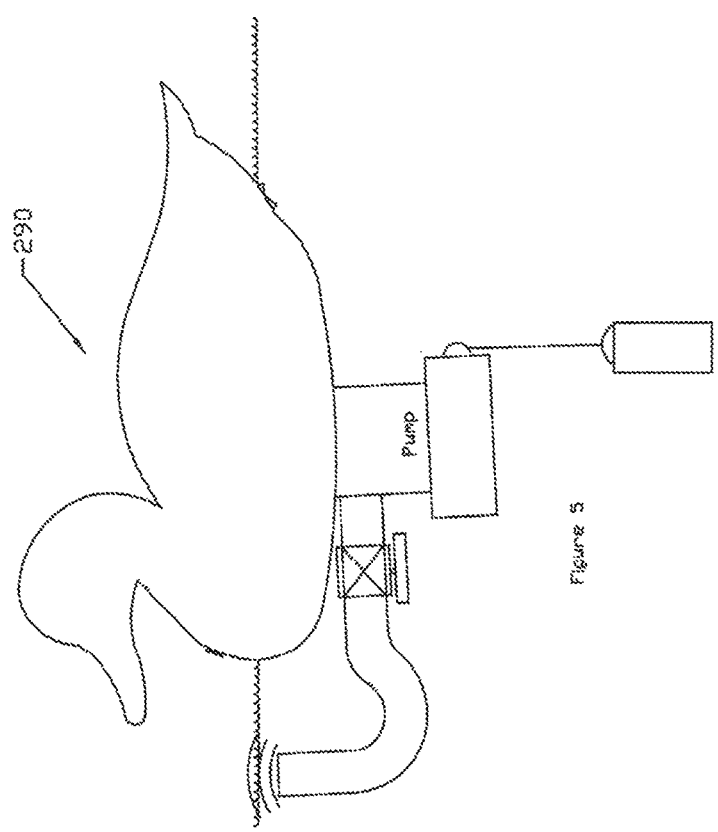
FIG. 5 shows the movement associated with a medium water flow.
Figure 7:
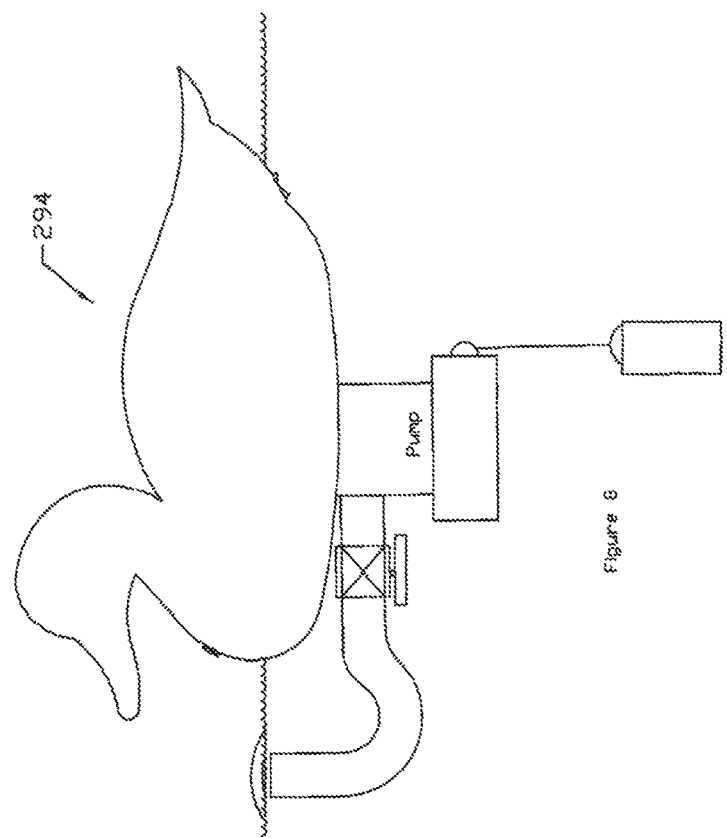
FIG. 7 shows the high flow forward position.
Figure 8:
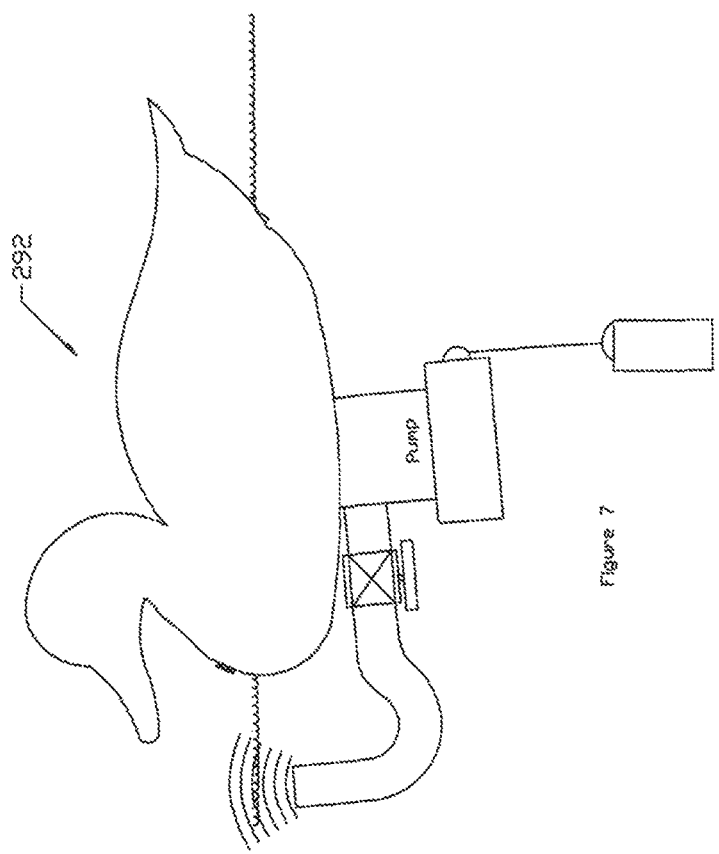
FIG. 8 shows the low flow forward position.

The output pipe 182 is connected through a water valve 230 to the water pipe 220 that extends to the vertical water outlet 240 that is positioned just below the water level 250 when the decoy 50 is in the balanced position shown in FIG. 1. A forward propulsion pipe 239 can also be connected and flowably controlled by the valve 230. In this manner, the out put can also be used for pumped water forward propulsion and can be combined with the unique vertical motion. For vertical movement, the water valve is used to control the water flow out of the vertical water outlet 240 to control the position of the decoy when the motor pump assembly 170 is moving water. As an example, we can look at the FIGS. 5 through 8 and compare a middle level of flow through the valve 230 to a full open valve position for high flow and an almost closed position for a low flow as indicated by the size of the flow circle 231. The bigger the circle 231, the more flow that is indicated. FIG. 5 shows a middle valve position on the flow circle 231 on the valve 230 when the motor pump assembly is activated and how the decoy 50 rocks forward and can achieve a middle forward lean position 290 in relation to the water level 250. FIG. 6 shows how the decoy 50 rocks backwards to the back lean position 300 when the flow is shut off and this rocking continues and slowly subsides until the decoy 50 settles back into the balanced position 280. The back lean position 300 is proportional to the front lean position such that a greater front lean results in a greater back lean and vise versa. FIG. 7 shows a large flow through the valve 230 as indicated by the large flow circle 231 and the decoy 50 achieving a high movement forward position 292. FIG. 8 shows a low movement forward position 294 for a low water flow through the valve 230 as indicated by the small flow circle 231. In this manner the magnitude of the movement can be controlled with the valve 230. Thus, the present invention present a remotely controlled self contained system that allows for controlling both the timing of the movement and the magnitude of the movement of the decoy 50.

Reference numerals used throughout the detailed description and the drawings correspond to the following elements:

Decoy 50
Decoy shaped housing 100
Outer wall 102
Head section 104
Body section 106
Front access aperture 108
Tail access aperture 110
Bottom access aperture 112
Tail section 114
Tail on position 116
Tail off position 118
Tail connection extensions 120
Inner compartment 122
Electrical circuit 128
Receiver 130
Switch wire 132
Power ground wire 134
Power out wire 136
Transmitter 140
User activated button 142
Wireless signals 144
Time pulsing relay 150
Relay power out 152
adjustable pulse resistor 160
external pulse control knob 162
resistor power out 164
motor pump assembly 170
assembly housing 172
top motor 174
bottom pump 176
motor ground 178
water pickup 180
output pipe 182
battery 190
charging port 200
positive terminal connection 202
negative terminal connection 204
switch 210
positive switch connection 212
water pipe 220
water valve 230
forward propulsion pipe 239
water outlet 240
water level 250
anchor tether 260
anchor weight 270
Balanced position 280

Middle forward lean position 290
High movement forward position 292
Low movement forward position 294
Back lean position 300

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically refers to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' 'having,' or 'including' should be interpreted as open ended claim language that allows additional elements or structures. Finally, where the claims recite "a" or "a first" element of the equivalent thereof, such claims should be understood to include incorporation of one or more such elements, neither requiring nor excluding two or more such elements.

What is claimed is:

1. A decoy apparatus for use in water defining a water level, the decoy apparatus comprising:
    a decoy shaped housing defining a body section with an access aperture;
    a motor pump assembly mounted to the decoy shaped housing, the motor pump assembly creating a water discharge having a discharge time;
    a water pipe connected to the motor pump assembly, the water pipe defining a vertical water outlet positioned just below the water level such that water is discharged from the outlet moves the decoy shaped housing to a forward lean position; and
    an electrical device mounted in the access aperture, the electrical device consisting of an adjustable resistor electrically connected to a timing pulse relay to adjust the pulse rate of the timing pulse relay to control the discharge time.

2. The apparatus of claim 1, wherein the access aperture is a front access aperture.

3. The apparatus of claim 1, wherein the access aperture is a tail access aperture.

4. The apparatus of claim 3, further comprising a moveable tail section positioned to cover the tail aperture.

5. The apparatus of claim 1, wherein the access aperture is a bottom access aperture.

6. A decoy apparatus, comprising:
    a decoy shaped housing;
    a motor pump assembly mounted to the decoy shaped housing, the motor pump assembly creating a water discharge having a discharge time;
    a water pipe connected to the motor pump assembly, the water pipe defining both a vertical water outlet and a forward propulsion pipe;
    an electrical device mounted in the decoy shaped housing, the electrical device consisting of an adjustable resistor electrically connected to a timing pulse relay to adjust the pulse rate of the timing pulse relay to control the discharge time; and
    a water valve flowably connected between the motor pump assembly, the forward propulsion pipe, and the vertical water outlet, the water valve splitting flow from the motor pump assembly to both the forward propulsion pipe and the vertical water outlet.

7. A decoy apparatus for use in water defining a water level, the apparatus comprising:
    a decoy shaped housing defining a body section with an inner compartment;
    an electrical circuit, the electrical circuit including a battery mounted in the inner compartment, a timing pulse relay electrically connected to the battery and mounted in the inner compartment, and a motor pump assembly electrically connected to the battery and the relay; and a water pipe flowably connected to the motor pump assembly, the water pipe including a vertical water outlet substantially parallel to the water level, and a forward propulsion pipe, the water valve splitting flow from the motor pump assembly to both the forward propulsion pipe and the vertical water outlet.

8. The apparatus of claim 7, the electrical circuit further comprising:
    a switch electrically connected to the motor pump assembly and mounted in the inner compartment.

9. The apparatus of claim 7, the electrical circuit further comprising:
    a remote control receiver electrically connected to the motor pump assembly and mounted in the inner compartment.

10. The apparatus of claim 7, the electrical circuit further comprising:
    an adjustable resistor electrically connected to the motor pump assembly and mounted in the inner compartment.

11. The apparatus of claim 7, the electrical circuit further comprising:
    a charging port electrically connected to the motor pump assembly and mounted in the inner compartment.

* * * * *